NON-STICKY WATER-SOLUBLE POLYVINYL ALCOHOL FILM

Hideo Suzumura, Katsuaki Hirano, and Teiichiro Chiba, Kurashiki, Japan, assignors to Kurashiki Rayon Co., Ltd., Kurashiki-shi, Japan, a corporation of Japan
No Drawing. Filed May 17, 1962, Ser. No. 195,385
Claims priority, application Japan, May 27, 1961, 36/18,653
10 Claims. (Cl. 260—17.4)

This invention relates to cold water-soluble polyvinyl alcohol compositions and films, and more particularly to novel polyvinyl alcohol compositions and films which are both cold water-soluble and non-sticky at high humidity.

Cold water-soluble polyvinyl alcohol films are known in the art. Such films can be made from partially hydrolyzed polyvinyl alcohol, acetalized polyvinyl alcohol having a low degree of acetalization, polyvinyl alcohol condensed with urethane and cyanoethylated polyvinyl alcohol. These films absorb moisture under high humidity conditions with the result that the surfaces of the film become sticky and tend to adhere to each other or "block." Other polyvinyl alcohol compositions and films which do not become sticky at high humidity are known, but these have the disadvantage of poor cold water-solubility.

According to this invention there are provided films of polyvinyl alcohol which have good cold water-solubility and yet are non-sticky even at high humidity. The films of this invention comprise polyvinyl alcohol and from 0.01 to 20% by weight of a surface active agent, based on the weight of polyvinyl alcohol. They preferably also contain from 2 to 50% by weight of a water-soluble starch, based on the weight of polyvinyl alcohol.

The polyvinyl alcohol used in this invention may be any of cold water-soluble forms of polyvinyl alcohol which are known in the art. These include for example partially hydrolyzed polyvinyl alcohol, in which the percentage of hydrolysis may range from about 80 to about 95 mol percent; acetalized polyvinyl alcohol, in which a small percentage, usually from about 1 to about 20%, of the hydroxyl groups of polyvinyl alcohol have been reacted with a low molecular weight aldehyde such as formaldehyde, acetaldehyde, butyraldehyde, decylaldehyde and the like; polyvinyl alcohol which has been reacted with a small amount of urethane; cyanoethylated polyvinyl alcohol, and the like. As previously explained, these polyvinyl alcohols when unmodified have good cold water-solubility, but films made therefrom tend to absorb moisture at high humidity and thereby become sticky.

The surface active agent in the films of this invention is an anionic or a nonionic surface active agent having a hydrophile-lipophile balance (HLB) in the range of 8 to 20. Inclusion of a surface active agent improves the cold water-solubility of the film and reduces stickiness at high humidity. The amount of surface active agents can range anywhere from 0.01% to 20%, based on the weight of polyvinyl alcohol, additions of as little as 0.01% of surface active agent are sufficient to improve the cold water-solubility of the compositions. Somewhat larger amounts, in excess of 0.2% by weight, are necessary if it is also desired to improve the non-sticking properties of the film to an appreciable extent. Amounts of surface active agents in excess of 20% based on the weight of polyvinyl alcohol do not improve the properties of the film as compared to films containing smaller amounts of surface active agents.

The alkali metal salts of dialkyl sulfosuccinates are particularly suitable anionic surface active agents for use in this invention. These include such compounds as sodium dioctyl sulfosuccinate and sodium dihexyl sulfosuccinate, both of which are well known commercial anionic surface active agents. Other known commercial anionic surface active agents, particularly sulfonated organic compounds of various salts, may also be used.

Instead of an anionic surface active agent, any of the well known polyoxyethylene type nonionic surface active agents may be used. These compounds include the ethylene oxide adducts of fatty acids, fatty alcohols, and alkylphenols. These compounds may be represented by the formula: $RO(CH_2CH_2O)_nH$, wherein R is selected from the group consisting of alkyl radicals containing from about 8 to 20 carbon atoms, alkanoyl radicals containing from about 8 to 20 carbon atoms, and alkylphenyl radicals in which the alkyl group contains from about 6 to 12 carbon atoms. The value of $n$ is such that the compound contains at least about 40% by weight of ethylene oxide. This represents a minimum value of approximately 2 to 4, depending on the formula weight of radical R. Generally the maximum value of $n$ does not exceed 100, although the polyoxyethylene chain may be as long as desired. Typical nonionic surface active agents usable in accordance with this invention are the ethylene oxide adducts of lauryl alcohol, stearyl alcohols, lauric acid, myristic acid, palmitic acid, stearic acid, oleic acid, p-octylphenol, and p-nonylphenol. Various surface active agents of this type are well known in the art and are readily available commercially. The surface active agent should have a hydrophile-lipophile balance (HLB) in the range of 8 to 20. The ethylene oxide percentage by weight can be approximated by multiplying the HLB value by 5. The amount of surface active agent is in the range of 0.01 to 20% by weight based on the weight of polyvinyl alcohol.

Any water-soluble starch is useful in the compositions of this invention. Various water-soluble dextrines such as amylodextrin, white dextrin, yellow dextrin, British gum, erythrodextrin, achrodextrin, and the like may be used. The water-soluble starch is added in an amount ranging from 2 to 50% by weight, based on the weight of polyvinyl alcohol. Addition of less than 2% of water-soluble starch is insufficient to reduce the stickiness of polyvinyl alcohol film under high humidity conditions to the desired degree. No more than 50% by weight of starch should be added because amounts in excess of this quantity cause a decrease in strength of the film and also cause brittleness.

Films according to this invention can be obtained by casting from an aqueous solution containing polyvinyl alcohol and surface active agent in the proportions hereinbefore stated, and preferably also containing starch in the amounts previously indicated. The films prepared according to this invention have greater cold water-solubility than the corresponding films prepared from unmodified polyvinyl alcohol. The films of this invention do not have any appreciable tendency to absorb water, even at high humidity, with the result that the film surfaces are non-sticky. The stickiness of films prepared according to this invention is far lower than the stickiness of unmodified polyvinyl alcohol films. In addition, films of this invention have satisfactory tensile strength, elongation and tear strength, and transparency which is as good as the transparency of the corresponding unmodified polyvinyl alcohol films.

This invention will now be described with reference to the following examples. In the following examples, adherence or stickiness was determined by placing two layers of the film together under a load of 100 gm./cm.$^2$ and storing the film under this load for 4 days at 20° C. and 90% R.H., and then for 2 days at 20° C. and 65% relative humidity, and the force necessary to pull the two layers apart is expressed in grams per centimeter. Cold water-solubility was determined by floating a sheet of film 2 x 2 cm. on the surface of water at 30° C. until the film was completely dissolved, and the solution time in minutes was determined.

Example 1

Film was cast from an aqueous solution containing acetalized polyvinyl alcohol having a degree of polymerization of 550 in which 18 mol percent of the hydroxyl groups had been reacted with formaldehyde, and 1.5% by weight of sodium dialkyl sulfosuccinate anionic surface active agent having an HLB of 12. For comparison the corresponding polyvinyl alcohol film containing no surface active agent was also prepared. Adherence of a pair of sheets and dissolving time of each film were determined at 20° C. and 65% relative humidity. Results are shown in Table 1 below:

TABLE 1

|  | PVA Film Containing Starch and Surfactant | Unmodified PVA Film |
| --- | --- | --- |
| Adherence of two sheets, gm./cm | 10 | 120 |
| Dissolving time, min | 4 | 10 |

Example 2

A film was cast from an aqueous solution of acetalized polyvinyl alcohol having a degree of polymerization of 550 in which 15 mol percent of the hydroxyl groups had been reacted with acetaldehyde and 5.0% by weight of a fatty acid ethylene oxide adduct type nonionic surface active agent having an HLB of 11.0. For comparison the corresponding film containing only acetalized polyvinyl alcohol was also cast from a second solution. The adherence of two sheets of each film at 20° C. and 65% relative humidity and the dissolving time of each film are shown in Table 2 below:

TABLE 2

|  | PVA Film Containing Starch and Surfactant | Unmodified PVA Film |
| --- | --- | --- |
| Adherence of two sheets, gm./cm | 40 | 250 |
| Dissolving time, min | 4 | 8 |

Example 3

Polyvinyl alcohol film was cast from a solution containing polyvinyl alcohol having a degree of polymerization of 1700 in which 6.5 mol percent of the hydroxyl groups had been reacted with urethane, 20% by weight of yellow dextrin, and 8% by weight of an alkylphenol ethylene oxide adduct nonionic surface active agent having an HLB of 15.0. For comparison a second film was cast from a solution containing the polyvinyl alcohol alone. Adherence and solution time were measured as heretofore described. Results were as follows:

TABLE 3

|  | PVA Film Containing Starch and Surfactant | Unmodified PVA Film |
| --- | --- | --- |
| Adherence of two sheets, gm./cm | 20 | 100 |
| Dissolving time, min | 3 | 13 |

In addition to the two foregoing films a third film prepared from a solution containing urethane-modified polyvinyl alcohol and dextrin but no surface active agent was also prepared. The film prepared according to this invention containing white dextrin and surface active agent had a better appearance than the film containing dextrin but no surface active agent, and as good an appearance as the film containing polyvinyl alcohol alone. The strength of all three films was approximately the same.

Example 4

Film was cast from a solution containing 88% hydrolyzed polyvinyl alcohol having a degree of polymerization of 1700, 20% by weight of water-soluble starch based on the weight of polyvinyl alcohol and 3% of a long chain aliphatic monohydric alcohol ethylene oxide adduct nonionic surface active agent having an HLB of 16. For comparison, a second film was cast from a solution of the 88% hydrolyzed polyvinyl alcohol containing no additives. Adherence and dissolving time were measured as described above. Results are shown in Table 4.

TABLE 4

|  | PVA Film Containing Starch and Surfactant | Unmodified PVA Film |
| --- | --- | --- |
| Adherence of two sheets, gm./cm | 20 | 120 |
| Dissolving time, min | 1 | 3 |

We claim:

1. A cold water-soluble polyvinyl alcohol film which is non-sticky at high humidity consisting of polyvinyl alcohol and from 0.2% to 20% by weight of a surface active agent having an HLB in the range of 8 to 20, based on the weight of polyvinyl alcohol.

2. A cold water-soluble polyvinyl alcohol film which is non-sticky at high humidity comprising polyvinyl alcohol, from 2% to 50% by weight of a water-soluble starch, based on the weight of polyvinyl alcohol, and from 0.2% to 20% by weight of a surface active agent having an HLB in the range of 8 to 20, based on the weight of polyvinyl alcohol.

3. A cold water-soluble polyvinyl alcohol film which is non-sticky at high humidity comprising polyvinyl alcohol, from 2% to 50% by weight of a water-soluble starch, based on the weight of polyvinyl alcohol, and from 0.2% to 20% by weight of an anionic surface active agent having an HLB in the range of 8 to 20, based on the weight of polyvinyl alcohol.

4. A cold water-soluble polyvinyl alcohol film according to claim 3 in which the anionic surface active agent is an alkali metal salt of a dialkyl sulfosuccinate.

5. A cold water-soluble polyvinyl alcohol film which is non-sticky at high humidity comprising polyvinyl alcohol, from 2% to 50% by weight of a water-soluble starch, based on the weight of polyvinyl alcohol, and from 0.2% to 20% by weight of a nonionic surface active agent having an HLB in the range of 8 to 20 and selected from the group consisting of ethylene oxide adducts of fatty acids, fatty alcohols and alkylphenols.

6. A process for preparing polyvinyl alcohol film which comprises casting said film from an aqueous solution consisting of polyvinyl alcohol and from 0.2% to 20% by weight of a surface active agent having an HLB in the range of 8 to 20, based on the weight of polyvinyl alcohol.

7. A process for preparing polyvinyl alcohol film which comprises casting said film from an aqueous solution comprising polyvinyl alcohol, from 2% to 50% by weight of a water-soluble starch based on the weight of polyvinyl alcohol, and from 0.2% to 20% by weight of a surface active agent having an HLB in the range of 8 to 20, based on the weight of polyvinyl alcohol.

8. A process for preparing polyvinyl alcohol film which comprises casting said film from an aqueous solution comprising polyvinyl alcohol, from 2% to 50% by weight of a water-soluble starch, based on the weight of polyvinyl alcohol, and from 0.2% to 20% by weight of an anionic surface active agent having an HLB in the range of 8 to 20, based on the weight of polyvinyl alcohol.

9. A process according to claim 8 in which the anionic surface active agent is an alkali metal salt of a dialkyl sulfosuccinate.

10. A process for preparing polyvinyl alcohol film which comprises casting said film from an aqueous solution comprising polyvinyl alcohol, from 2% to 50% by weight of a water-soluble starch, based on the weight of polyvinyl alcohol, and from 0.2% to 20% by weight of a nonionic surface active agent having an HLB in the range of 8 to 20 and selected from the group consisting of ethylene oxide adducts of fatty acids, fatty alcohols and alkylphenols.

References Cited by the Examiner

UNITED STATES PATENTS

| 2,162,618 | 6/1939 | Izard | 260—91.3 |
|---|---|---|---|
| 3,067,152 | 12/1962 | Fukushima et al. | 260—17.4 |
| 3,087,920 | 4/1963 | Suzumura et al. | 260—91.3 |
| 3,142,532 | 7/1964 | Fukushima et al. | 260—17.4 |
| 3,251,795 | 5/1966 | Fukushima et al. | 260—91.3 |

FOREIGN PATENTS

| 393,505 | 6/1933 | Great Britain. |
|---|---|---|

LEON J. BERCOVITZ, *Primary Examiner.*

JAMES A. SEIDLECK, *Examiner.*

R. W. GRIFFIN, *Assistant Examiner.*